(12) United States Patent
Sutter et al.

(10) Patent No.: US 11,400,659 B2
(45) Date of Patent: Aug. 2, 2022

(54) SEALING PROFILE RECEIVING DEVICE HAVING A FIRST AND A SECOND HOLDING UNIT

(71) Applicant: STEFAN PFAFF WERKZEUG-UND FORMENBAU GMBH & CO KG, Röthenbach (DE)

(72) Inventors: Anton Sutter, Weiler-Simmerberg (DE); Simon Braun, Grünenbach (DE)

(73) Assignee: Stefan Pfaff Werkzeug-Und Formenbau Gmbh & Co KG, Röthenbach (DE)

( * ) Notice: Subject to any disclaimer, the term of this patent is extended or adjusted under 35 U.S.C. 154(b) by 373 days.

(21) Appl. No.: 16/595,872

(22) Filed: Oct. 8, 2019

(65) Prior Publication Data

US 2020/0114587 A1     Apr. 16, 2020

(30) Foreign Application Priority Data

Oct. 10, 2018   (EP) .................................... 18199720

(51) Int. Cl.
*B29C 45/40*     (2006.01)
*B29C 65/78*     (2006.01)
(Continued)

(52) U.S. Cl.
CPC ........ *B29C 65/7841* (2013.01); *B29C 45/006* (2013.01); *B29C 45/4005* (2013.01); *B29L 2031/26* (2013.01)

(58) Field of Classification Search
CPC ......... B29C 2045/1454; B29C 65/7841; F16G 13/06; F16G 13/07
See application file for complete search history.

(56) References Cited

U.S. PATENT DOCUMENTS 4,310,376 A * 1/1982 Ebina .................. B29C 65/2076
                                                                 156/499
5,779,956 A   7/1998 Hollingshead et al.
(Continued)

FOREIGN PATENT DOCUMENTS

EP     1 642 696 A1   4/2006
EP     3 093 115 B1   7/2017
(Continued)

OTHER PUBLICATIONS

Extended European Search Report (Application No. 18199720.6) dated May 3, 2019.

*Primary Examiner* — Scott W Dodds
(74) *Attorney, Agent, or Firm* — Burr & Brown, PLLC

(57) ABSTRACT

A sealing profile receiving device having first and second holding units for receiving and holding first and second sealing profile elements, and a casting unit for casting a connecting portion for connecting the first and second sealing profile elements and/or for casting first and second end terminations of the first and second sealing profile elements. A first and/or second and/or third drive unit for driving at least one holding and/or clamping and/or ejector element is/are provided and includes a chain comprising a plurality of chain links arranged at least between two guide faces of a guide unit for guiding the chain and/or chain links, such that an adjusting force can be exerted in the pulling and pushing directions of the chain by the first and/or second and/or third drive unit.

11 Claims, 8 Drawing Sheets

(51) Int. Cl.
*B29C 45/00* (2006.01)
*B29L 31/26* (2006.01)

(56) References Cited

U.S. PATENT DOCUMENTS

| | | | | |
|---|---|---|---|---|
| 6,092,489 | A * | 7/2000 | Huettner | A01K 15/026 |
| | | | | 119/707 |
| 6,321,523 | B1 * | 11/2001 | Christmas | F16G 13/06 |
| | | | | 59/5 |
| 2008/0234086 | A1 * | 9/2008 | Fujiwara | F16G 13/06 |
| | | | | 474/209 |
| 2017/0246770 | A1 | 8/2017 | Belliard | |
| 2017/0246771 | A1 | 8/2017 | Belliard | |
| 2017/0326698 | A1 | 11/2017 | Reiners et al. | |
| 2018/0065284 | A1 | 3/2018 | Sutter | |

FOREIGN PATENT DOCUMENTS

| | | |
|---|---|---|
| EP | 3 210 746 A1 | 8/2017 |
| EP | 3 210735 A1 | 8/2017 |
| EP | 3 056 311 B1 | 1/2018 |
| JP | S62-287631 A1 | 12/1987 |
| WO | 2017/075025 A1 | 5/2017 |
| WO | 2018/083068 A1 | 5/2018 |

\* cited by examiner

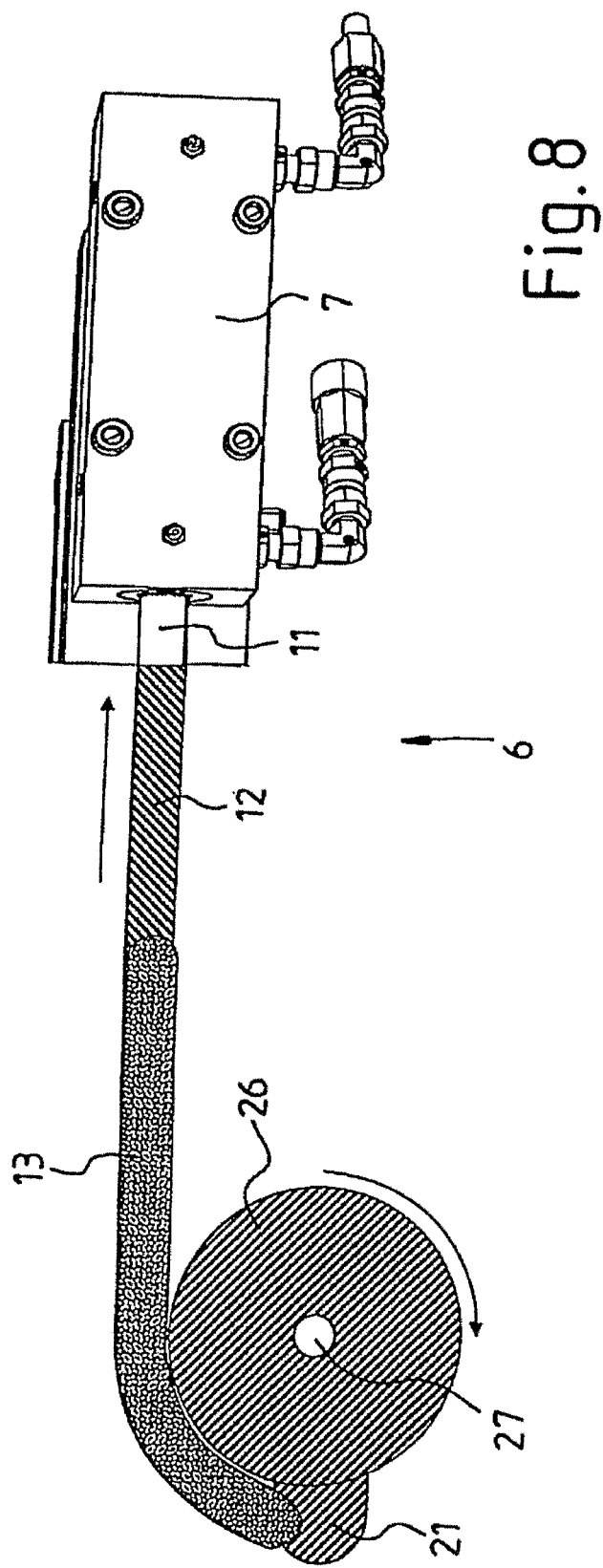

SEALING PROFILE RECEIVING DEVICE HAVING A FIRST AND A SECOND HOLDING UNIT

This application claims the benefit under 35 USC § 119(a)-(d) of European Application No. 18 199 720.6 filed Oct. 10, 2018, the entirety of which is incorporated herein by reference.

FIELD OF THE INVENTION

The present invention relates to a sealing profile receiving device having at least one first holding unit for receiving and holding a first sealing profile element and having a second holding unit for receiving and holding a second sealing profile element, and having at least one casting unit for casting at least one connecting portion for connecting the first sealing profile element to the second sealing profile element and/or for casting a first end termination of the first sealing profile element and a second end termination of the second sealing profile element.

BACKGROUND OF THE INVENTION

It is already known practice to manufacture sealing profiles, for example, for vehicle doors, by molding individual profile parts on a first profile, known as a central profile (for example, EP 3 093 115 B1, EP 3 056 311 B1). In order to carry out such a molding-on operation, it is possible for the central profile to be introduced into a first mold and for the second profile that is to be molded on to likewise be introduced in a region of the mold.

It is also possible for separate molding-on operations to be carried out, with which no profile is added, but merely the end of a profile is provided with a plastics termination. In this case, in series production, at least two, but also several profiles are usually processed at the same time, i.e. corresponding ends or terminations are cast on to four profiles using a common molding-on operation or in a common receiving device.

Usually, such profiles or profile parts are comparatively long and thin and consist substantially of elastic, soft material with a high coefficient of friction, such as thermoplastic elastomer (TPE) or rubbers, for example, EPDM, TPO, TPU, PP, PPE, PIB, PS, PETP, POM, TPU or the like. Therefore, these profiles have to be introduced into the receiving devices or holders/molds with a large amount of play or air, and for casting, the molds or holders have to fit or be clamped very tightly and be removed again with a large amount of play or air. Thus, the holders are mostly formed in at least two parts, wherein at least one component or element is adjustable relative to the other. In addition, the finished profiles frequently have to be thrown out of the mold/holder in order to remove them, such that a new profile can subsequently be produced with the receiving device.

For these adjusting movements of the corresponding components or elements, various drives are necessary. On account of the complexity of the receiving devices and of the partially nonlinear or curved-path adjusting movements and on account of the different adjustment paths/lengths, adjusting directions, adjusting forces etc., a wide variety of drives are used, which are usually designed individually for each vehicle door seal. In addition to automated drives such as reciprocating piston cylinders, rack and pinion drives, use is also made of manual drives, for example, rotary/pivoting mechanisms or curved paths, which are actuated by operators by means of handles.

The complexity of the receiving devices also means that, inter alia, the arrangement and the use of the drives are impaired by a significant lack of space. Thus, deflections or changes in direction of 90°, 135° etc. between what is known as the drive input and what is known as the drive output are frequently necessary in order to arrive at the element/mold part to be adjusted. It is also necessary to comply with safety requirements for free, safe access and for manual actuation on the part of the operator.

In the processing of thermoplastics and elastomers, working temperatures of up to about 200° C. are normal, and so the receiving device and corresponding components have to be heated and/or cooled in part. Accordingly, high thermal demands are placed, in particular, on the drives and adjustable components.

Thus, these drives and adjustable components not only have to withstand the high temperatures over countless production cycles, but also have to be configured in a space-saving manner and be able to be arranged in a very flexible manner, in order not to be in the way of other components such as holders or molds or of the operator, or the introduction and removal of the profiles.

Therefore, hitherto, not only the receiving devices but also the drives have been adapted virtually individually to the particular adjustment, this involving a large amount of structural and financial outlay.

SUMMARY OF THE INVENTION

Accordingly, the object of the present invention is to propose a sealing profile receiving device of the type mentioned at the beginning, which meets high demands and is also producible in an economically favorable manner.

Accordingly, a sealing profile receiving device according to the present invention is distinguished by the fact that the first and/or second and/or third drive unit has at least one chain comprising a plurality of chain links, wherein the chain and/or chain links is/are arranged at least between two guide faces of a guide unit for guiding the chain and/or chain links, such that an adjusting force is able to be exerted both in the pulling direction and in the pushing direction of the chain by way of the chain drive.

With the aid of this measure, the drive(s) can be adapted very flexibly to a wide variety of requirements and spaces, since the guide or the guide faces along which the adjustable chains/chain links are guided, can be configured/produced in a wide variety of designs/forms without a large amount of outlay. By way of the chain guided according to the present invention, both pulling forces and pushing forces can be exerted on the elements to be adjusted, such that the latter can advantageously be subjected to force in two opposite directions. This allows advantageous opening and closing of the holding units and/or ejectors etc. in a particular compact construction.

According to the present invention, the compactly configured drives or drive units can be standardized for the individual sealing profile receiving devices, even though the drives have to be adapted to a wide variety of boundary conditions, such as space, few positioning options vis-à-vis free space for the operator etc., orientation with respect to the element to be adjusted, length of the adjustment paths, different adjustment paths or portions, for example, rotary and/or pivoting movement and/or curved path and/or linear movement. For all these different boundary conditions, in particular different adjustment paths, different drives have had to be developed hitherto. This resulted in high development and production costs of correspondingly individual sealing profile receiving devices. Standardization of the drive or of the essential components of the drive units according to the present invention for sealing profile receiving devices has a particularly positive economic effect.

Preferably, a linear movement of the adjustable holding element and/or of the ejector is realized. However, it is also possible, for example, for rotary and/or pivoting movements, curved-path adjustments of the adjustable holding element and/or of the ejector to be advantageously realized.

Furthermore, it is also possible, on account of the high flexibility of the drive or of the drive units according to the present invention, for increasing automation, compared with the prior art, of the sealing profile receiving devices to be realized. For example, drives or drive units according to the present invention can also be used instead of previously conventional manual drives or handles. As a result, the physical burden on the operator can be relieved, making the currently still necessary amount of manual operation, or the person, more productive, as considered over an entire working day with sometimes hundreds of sealing profiles to be manufactured. In addition, usually quicker and more controlled manufacture with fewer faults is achieved, at least for the adjustments and work steps in which no intermediate steps and/or complex curved paths need to be realized. Increasing automation also ensures a considerable reduction in the risk of injury to the operator, i.e. fewer manual handles or engagements reduces the risk of the operator trapping or jamming their fingers or hands and being able to suffer significant injuries.

Advantageously, the first and/or second and/or third drive unit comprises at least one linear drive for linearly adjusting a first drive element. For example, the linear drive can be in the form of a linear motor or the first drive element of the linear drive can be in the form of a rack or threaded rod. Preferably, the linear drive is in the form of a reciprocating piston-cylinder unit, wherein the first drive element is in the form of an adjustable piston.

In a particular development of the present invention, the chain and/or chain links is/are arranged between the first drive element and a second drive element. In this case, the second drive element can advantageously carry out a linear movement. However, it is also possible, for example, for rotary and/or pivoting movements, rotations, (arcuate/undulating) curved-path adjustments of the second drive element or of what is known as the drive output element to be realized.

In an advantageous variant of the present invention, the first drive element is adjustable in a first adjusting direction and the second drive element is adjustable in a second adjusting direction, wherein the first adjusting direction is oriented at an angle, in particular, perpendicularly, to the second adjusting direction. In this way, an advantageous deflection or change in direction can be realized between the first drive element and second drive element. Thus, for example, virtually any desired deflection of, for example, about 30°, 45°, 90°, 110°, 135° or 160° etc. can be realized. This means that a virtually free or any desired choice of angle can be realized, and so an advantageous adaptation to or flexibility with regard to the constrained and/or given geometric conditions of the receiving device can be achieved.

Appropriate angular adaptation can be achieved only by the guide unit being configured in an appropriate manner, i.e. in accordance with the spatial conditions determined by other components. According to the present invention, the chain/chain links, first and second drive element and drive device, such as reciprocating piston-cylinder unit or the like, do not need to be adapted/altered or only need to be adapted/altered minimally, for example, chains of different lengths by means of a different number of (standardized) chain links. Accordingly, the producer of sealing profile receiving devices can realize comparatively large quantities as regards these essential components of the drive unit according to the present invention, thereby considerably reducing the outlay for development and construction and thus particularly the financial outlay.

Preferably, the guide unit comprises at least one guide slot and/or guide recess. For example, a guide element comprises the guide slot and/or guide recess, wherein advantageously a cover element/plate or the like is provided. In this way, an advantageous closed guide for the chain or chain links can be realized. This is positive as regards operational reliability and exact guidance.

Any adaptation or alteration of the orientation of the drive or of the second adjusting direction of the second drive element can in this case be implemented simply by a correspondingly changed shape of the guide slot and/or guide recess, wherein, in particular, a housing and/or an external shape and/or further elements of the guide unit can remain virtually unaltered. For example, the guide slot and/or guide recess can be generated advantageously by means of machining production methods such as milling or the like. This is cost-effective and implementable for example with modern CNC machine tools without significant outlay and in any desired form.

Advantageously, the guide unit comprises at least one curved and/or round guide portion for deflecting the chain and/or chain links. In this way, the deflection or change in direction between the first drive element and second drive element is implementable in an advantageous manner.

Alternatively or in combination therewith, the guide unit can comprise at least one deflection wheel, which is rotatable about an axis of rotation, for deflecting the chain and/or chain links. In this way, advantageous guidance of the chain or chain links in the guide unit can be realized. It is also possible for an advantageous rotary movement or rotation of the second drive element to be realized. This means that, for example, a linear drive or a linear adjustment of the first drive element by means of the chain or chain links according to the present invention is advantageously convertible into a rotation of the second drive element.

Advantageously, at least two chains are fixed to the first drive element of the linear drive, such that, when the first drive element is adjusted, the at least two chains are adjusted at the same time. As a result, a single or common drive is usable for, for example, two or four different, adjustable elements such as holding elements, ejectors or the like. This dual use of a drive such as a pneumatic or hydraulic reciprocating piston-cylinder drive reduces the structural outlay and also the space requirement. This is extremely advantageous particularly in the case of the complex sealing profile receiving devices.

Preferably, the chain and/or chain links has/have at least rollers comprising running surfaces, wherein the running surfaces of the rollers are arranged on the guide faces of the guide unit. This improves the running properties of the chain in the guide unit and reduces abrasion and wear.

In an advantageous variant of the present invention, the running surfaces of the rollers and/or the guide faces of the guide unit are hardened. This further improves the lifetime and maintainability of the guide, since lubrication with (conventional) oils or greases is very restricted by the sometimes high temperatures of about 200° C.

On account of the sometimes very hot working temperatures, parts of the drive units or the drive components, for example, the reciprocating piston-cylinder drives or the like, are thermally insulated and/or shielded from the molds or components of the receiving device according to the present invention at a temperature of about 200° C. For example, advantageously thermal insulation elements/layers are provided between the holding unit and drive unit and/or parts of the drive unit. By contrast, it is quite possible for the guide device and/or the chain and/or chain links according to the present invention to be arranged in the hotter region of the receiving device.

Particularly metal chains can easily bear temperatures of about 200° C., and, in particular, with the advantageous rollers a relatively long lifetime can be achieved, even without conventional or with minimal or specific lubrication.

The chain and/or guide unit according to the present invention can be configured/used as an advantageous spacer unit and/or thermal insulation device between the element/ejector to be adjusted or the hot working area and the drive components such as reciprocating piston etc. or a non-hot or relatively cold, in particular, cooled region of the receiving device according to the present invention.

A width and/or height of the guide or of the guide slot and/or guide recess has a comparable size to a width and/or height of the chain and/or chain links and/or rollers. In this way, the guide is further improved or stabilized.

Preferably, two rollers are provided transversely to the running direction of the chain. This ensures particularly stable and controlled guidance of the chain in the guide unit or the guide slot and/or guide recess. Advantageously, at least one link plate, in particular two link plates of a chain link, is arranged between two rollers of the chain. These measures effectively prevent the chain/chain links or the like from tipping to the side.

Advantageously, the receiving device according to the present invention serves primarily to receive a first or central sealing profile, in particular, for vehicle doors or the like, wherein advantageously at least one further profile is intended to be molded onto the first profile. The receiving device is installed or arranged for this purpose in a corresponding injection-molding machine. To this end, the receiving device according to the present invention comprises at least one mold having preferably at least two mold parts or mold elements in order to hold/fix and/or clamp the first profile in the mold or in the two mold parts or mold elements at least partially at least during a casting phase and/or a curing or cooling phase.

Each of the holding units according to the present invention advantageously comprises one (in particular, at least two-part) mold, which completely encloses the profile at several sides/faces, in particular, at five sides/faces and in which the molding-on operation is carried out. The mold can be installed as a whole in an injection-molding machine. It can also be assembled from individual mold parts.

In an advantageous variant of the receiving device according to the present invention, the at least two holding units are connected together via a connecting device, wherein the connecting device connects in each case two of the at least two mold parts/elements together. In principle, as many connecting devices as desired can be provided. The connecting device additionally serves to orient the first profile, i.e. the first profile can rest against the connecting device and thus be positioned (for example, directed in a straight line). Advantageously, the first profile can in this way be held in a dimensionally stable manner along its entire length or at least along virtually its entire length. The molds in turn have a receiving opening for receiving and holding the profile. In order to introduce the profile, the mold can be placed or pushed onto the profile or, conversely, the profile can be placed or pushed (manually) into the mold and/or holding unit.

The receiving device according to the present invention is accordingly configured to receive the sealing profile(s) at least partially in a retractable manner in at least one of the molds.

In the mold, it is possible, for example, for a further profile to be molded on. It is also possible for a further mold to optionally be used in addition. Thus, it is advantageously possible to carry out at least two, in particular, a plurality of molding-on operations in parallel, i.e. at the same time. This goes, in particular, for molding-on operations in which not only end processing takes place or a termination end is molded on, but also in which two profiles are connected together via a molding-on operation.

In end processing, as a rule only the plastic is applied to the profile, but no further profile is connected to the central profile. Thus, in an embodiment variant of the present invention, it is possible to provide, for example, an end of a profile with a molded-on termination, i.e. what is known as end molding-on, without a further profile being attached thereto. Furthermore, what are known as positioning pins are molded on, which can serve as reference marks for positioning. This variant is, therefore, usable in a particularly flexible manner.

Here, usually four or more profiles or molding-on operations are carried out in parallel, i.e. at the same time.

It is conceivable to clamp the receiving device according to the present invention in a single injection-molding machine and to carry out the processing operations/molding-on operations there. Depending on the type of profile to be processed, it may be advantageous, however, to clamp the receiving device in different injection-molding machines for different molding-on operations. The injection-molding machines can in this case be arranged in a fixed position with respect to one another. Depending on the profile to be processed, space problems can otherwise arise when the corresponding injection-molding units are positioned with respect to the profile.

Furthermore, it may also be advantageous to use different injection-molding units when different plastics are injected. In principle, however, it is also conceivable to incorporate the receiving device according to the present invention in a single injection-molding machine and to carry out the (different) molding-on operation(s) there. Advantageously, the present invention makes it possible to carry out simultaneous molding-on of different injection-molding elements/components, in particular, injection-molding elements/components that differ in terms of their processing parameters and their processing time.

An injection-molding element/component is understood here to be the plastic to be molded on, for example, a thermoplastic elastomer or EPDM etc. Furthermore, the present invention makes it possible for two different injection-molding elements/components to be molded on to the profile at the same time in one mold, generally at different points of the profile.

BRIEF DESCRIPTION OF THE DRAWINGS

A preferred exemplary embodiment of the present invention is illustrated in the drawing and explained in more detail in the following text with reference to the figures.

FIG. 8 shows a schematic view of a further drive unit according to the present invention with a rotatable output wheel to be adjusted.

DETAILED DESCRIPTION OF THE INVENTION

Figure 1:
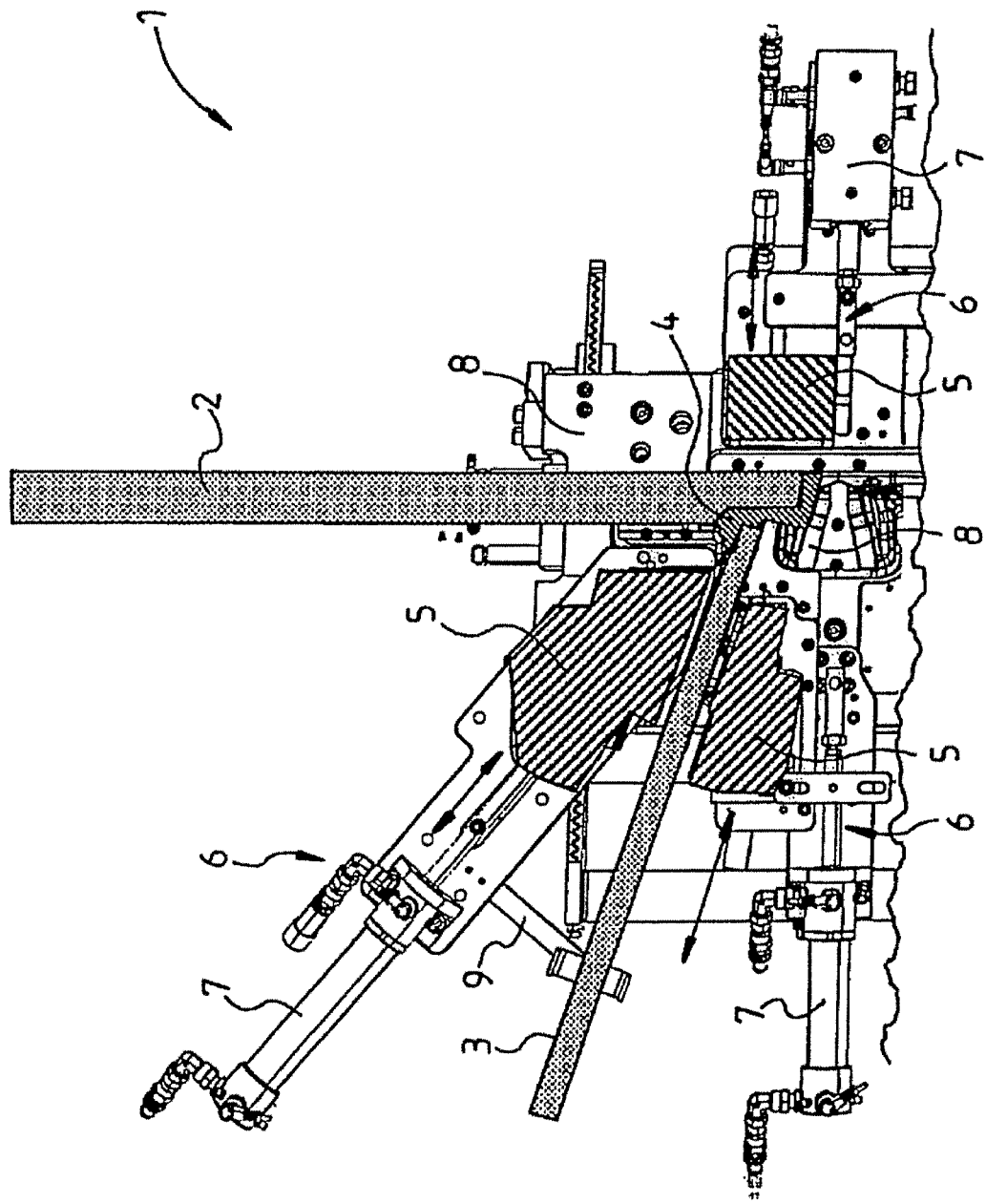
FIG. 1 shows a schematic, partially sectional plan view of one half of a first receiving device with three drive units according to the present invention.

FIG. 1 schematically illustrates a sealing profile receiving device 1 according to the present invention. Using said device, two profiles 2, 3 are connected together by means of a joint 4, for example, for a vehicle door seal. Without being illustrated in more detail, a plastic injection-molding unit is provided for this purpose, which introduces the joint 4 in the injection-molding process.

According to the present invention, the flexible, elastic profiles 2, 3 are positioned and held inter alia in each case by means of holders or clamping jaws 5 that are adjustable along an adjustment path (arrows and double arrows) and by means of non-adjustable counterholders or clamping jaws 8 and, if necessary, additionally by a support 9 or the like. The clamping jaws 5, 8 are configured such that, for the insertion/introduction of the profiles 2, 3, they have a large amount of play or a great width and, for the casting process, are moved very close to or bear very tightly against the profile 2, 3, such that the liquid or flowable plastic for the joint 4 is molded correctly during the injection-molding operation. Thus, in each case a part or peripheral region of the clamping jaws 5, 8 and optionally further mold elements (not all illustrated in more detail) form a (closed) mold for the casting process.

After the joint 4 has cured or cooled, the adjustable clamping jaws 5 are retracted again, such that a large amount of play or a great width arises again. Without being illustrated in more detail in FIG. 1, ejectors 10 are frequently also provided, as schematically illustrated in the variant or view according to FIGS. 2 and 6, the ejectors 10 lifting and ejecting the finished or connected profile unit/vehicle seal in an adjustment directed transversely to the plane of the page.

Since vehicles such as cars, trucks etc. usually require a "left-hand" and a "right-hand" vehicle seal, the sealing profile receiving device 1 is not only "tailored" or configured individually for the vehicle, but is usually also configured such that it can receive the profiles 2, 3 for both vehicle seals at the same time. Thus, for reasons of clarity, only one half of a sealing profile receiving device 1 is illustrated in FIG. 1.

However, it is already clear from FIG. 1 that, particularly, when both halves of the sealing profile receiving device 1 are considered/present, there is only little space for an operator to fit/introduce the individual, unconnected profiles 2, 3 and to start/initiate the clamping operations and to remove the (two) vehicle seals from the sealing profile receiving device 1 again. At the same time, strict safety regulations have to be complied with, since the adjusting operations represent a considerable risk of injury to the operator's hands and fingers. Accordingly, there has to be good accessibility for the operator, this in turn restricting the arrangement of the components of the sealing profile receiving device 1 and thus the available space and the positioning freedom therefor in a corresponding manner.

Moreover, there is also already very little space in the central region of the joint 4 to be cast as a result of the great complexity and number of the components of the sealing profile receiving device 1, such as, inter alia, the drive components of the adjustable clamping jaws 5 and ejectors 10 (cf. in particular, FIG. 6) and the injection-molding components, heating and/or cooling ducts, supply lines and so on (not illustrated in more detail). Since, however, the molds or profile holders are of central importance and are not variable and not positionable differently, the space and the options for the drives of the adjustable clamping jaws 5 and ejectors 10 are extremely limited. As a result, these drive components have to be constructed and developed individually for the sealing profile receiving device 1.

The necessary adjusting movements are advantageously realized by means of drive units 6 according to the present invention, which preferably each comprise as drive a pneumatic or hydraulic reciprocating piston cylinder 7 having a linearly adjustable piston rod 11. As is clear from a variant according to FIG. 2, the drive unit 6 according to the present invention has a chain 13 comprising a plurality of chain links 16, which is guided/arranged in an advantageous guide 14 or a guide element having a slot 22. This chain 13 is advantageously connected at one end to the piston rod 11 by way of a linearly adjustable, guided drive rod 12. At the other end, the chain 13 is connected to a pusher 15 or what is known as an output element. It is apparent from FIG. 2 that the drive direction of the piston rod 11 and drive rod 12 is oriented at an angle, i.e. substantially perpendicularly, to the output direction or adjusting direction of the pusher 15 and thus also of the clamping jaw 5 or ejector 10, which is illustrated very schematically here. For this purpose, the guide 14 or the slot 22 has a curve 28, thereby realizing this deflection.

Since, advantageously, the reciprocating piston cylinder 7 is able to be pressurized on both sides, the pusher 15 can be adjusted, by means of the chain 13 guided in the guide 14, both by way of a pushing force and of a pulling force as per the illustrated double arrows. However, a variant with a reciprocating piston cylinder 7 that is able to be pressurized only on one side is also possible, wherein, for example, the force of gravity or a spring force generates the restoration or the pulling force.

Figure 2:
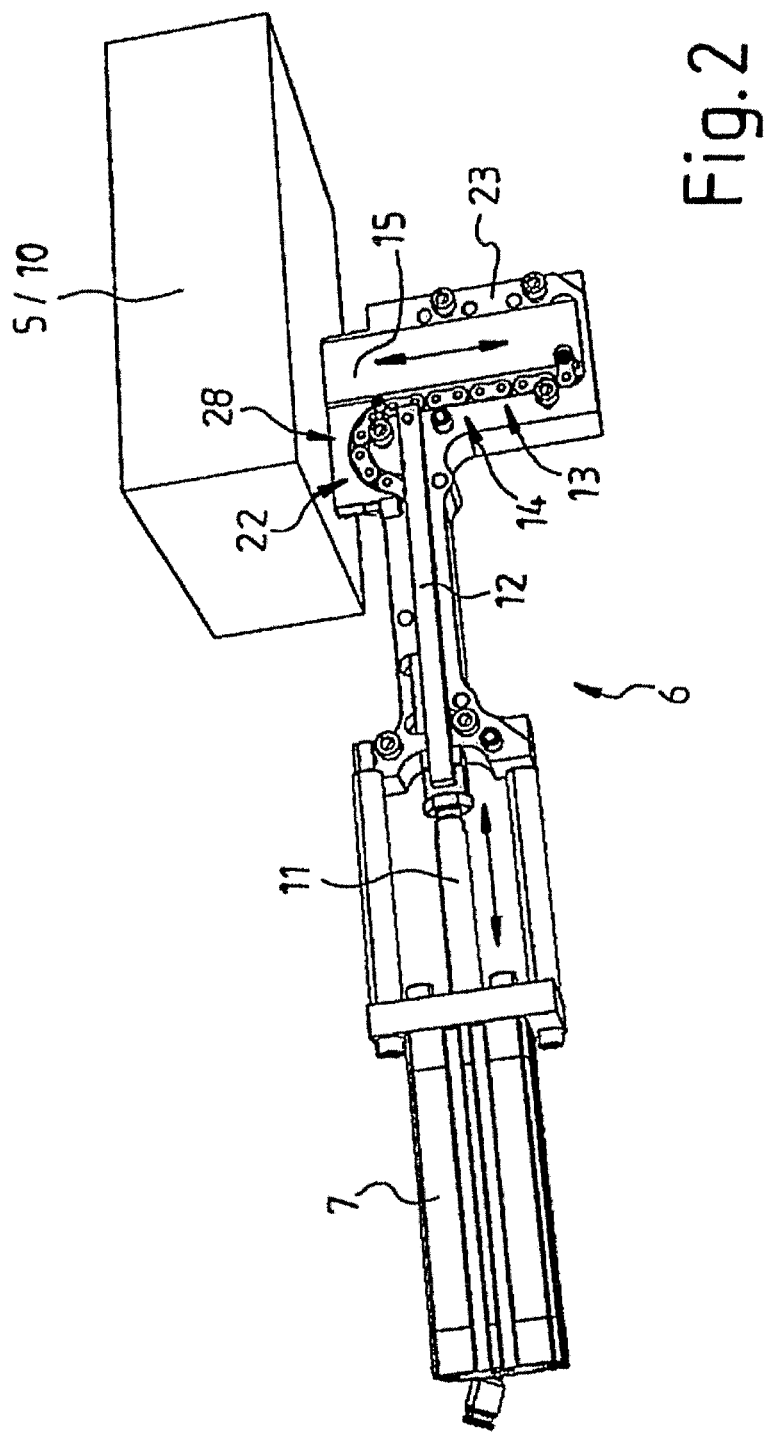
FIG. 2 shows one of the three drive units according to FIG. 1 in a schematic, perspective view.

As an alternative to the variant illustrated in FIG. 2, a second variant is also realizable, for example, without major structural outlay, wherein the pusher 15 and the clamping jaw 5 or the ejector 10 is not arranged at or protrudes from the top of the guide 14, but is arranged at the bottom, wherein the slot 22 and the drive, i.e. the components 7, 11, 12, remain unchanged. This very small structural change to the drive unit 6 results, however, in a reversal of the adjustment, or in an output direction, rotated through 180°, of the pusher 15 and thus of the adjustment of the output.

Optionally, by exchanging the (commercially customary) reciprocating piston cylinder 7 or the piston rod 11, an adjustment with a different length can be realized. This already demonstrates the great flexibility of the drive unit 6 according to the present invention. Thus, it is possible for many (essential) components to be carried over to a wide variety of or individual variants in a completely or virtually completely unchanged manner, and thus for the drive to be standardized. This reduces the structural and the financial outlay.

The great flexibility of the drive unit 6 according to the present invention is also demonstrated by the further variants according to FIGS. 5 to 8. Thus, the variant according to FIG. 5 comprises a drive rod 12 to which two chains 13 are fixed at the same time and which drives the latter and two pushers 15. These two pushers 15 can drive or (vertically) lift, for example, a relatively large plate, or clamping jaw 5 or ejector 10. This prevents disadvantageous tipping or tilting of the quite large, heavy (metal) plate or clamping jaw 5, ejector 10, etc. Moreover, as shown by means of the symbolic dashed line 29 schematically indicated centrally in the plate or clamping jaw 5 or the ejector 10, it is also possible for two different plates, or clamping jaws 5 or ejectors 10 to be adjusted or lifted at the same time/synchronously.

Figure 6:
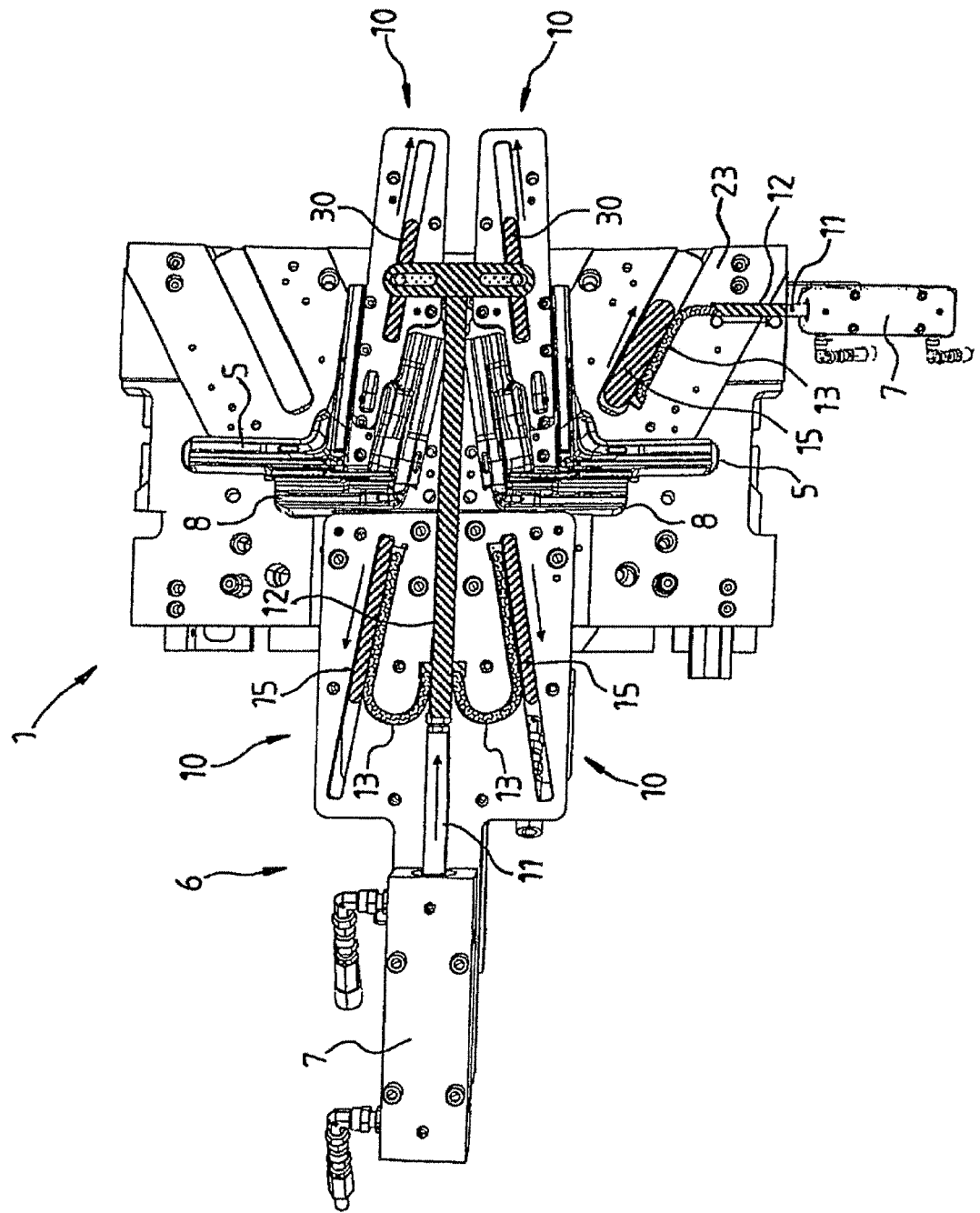
FIG. 6 shows a schematic, partially sectional plan view of a second receiving device with a further drive unit according to the present invention, which comprises a common, second drive rod and two synchronous chains according to the invention and two synchronous pushers.

In the further variant illustrated in FIG. 6, a common drive rod 12 drives not only two chains 13 according to the present invention but also two lifters 30 that have a slope. These lifters 30 comprise an oblique plane, which is operatively connected to a second element (not illustrated in more detail) having a corresponding slope, and generate (vertical) lifting, oriented transversely to the plane of the page, of an ejector device.

The chains 13 used in FIG. 6 have a deflection of more than 180° and the illustrated pushers 15 can accordingly have a slope or an oblique plane and are likewise operatively connected to a second element (not illustrated in more detail) having a corresponding slope, and generate (vertical) lifting, oriented transversely to the plane of the page, of the or a second, separate ejector device. This variant also shows, inter alia, the advantageous dual use of essential components of the drive unit 6 according to the present invention and also the space-saving configurability of in this case four simultaneous, separate adjustment paths/components.

Furthermore, FIG. 6 shows a variant of a further drive unit 6 according to the present invention, wherein the guided chain 13 realizes a deflection through about 60°. FIG. 6, therefore, also shows that, with regard to the arrangement or positioning of the drive units 6, or of the reciprocating piston cylinder 7 or of the piston rod 11, these can be adapted to the given (spatial) boundary conditions without great effort.

Figure 7:
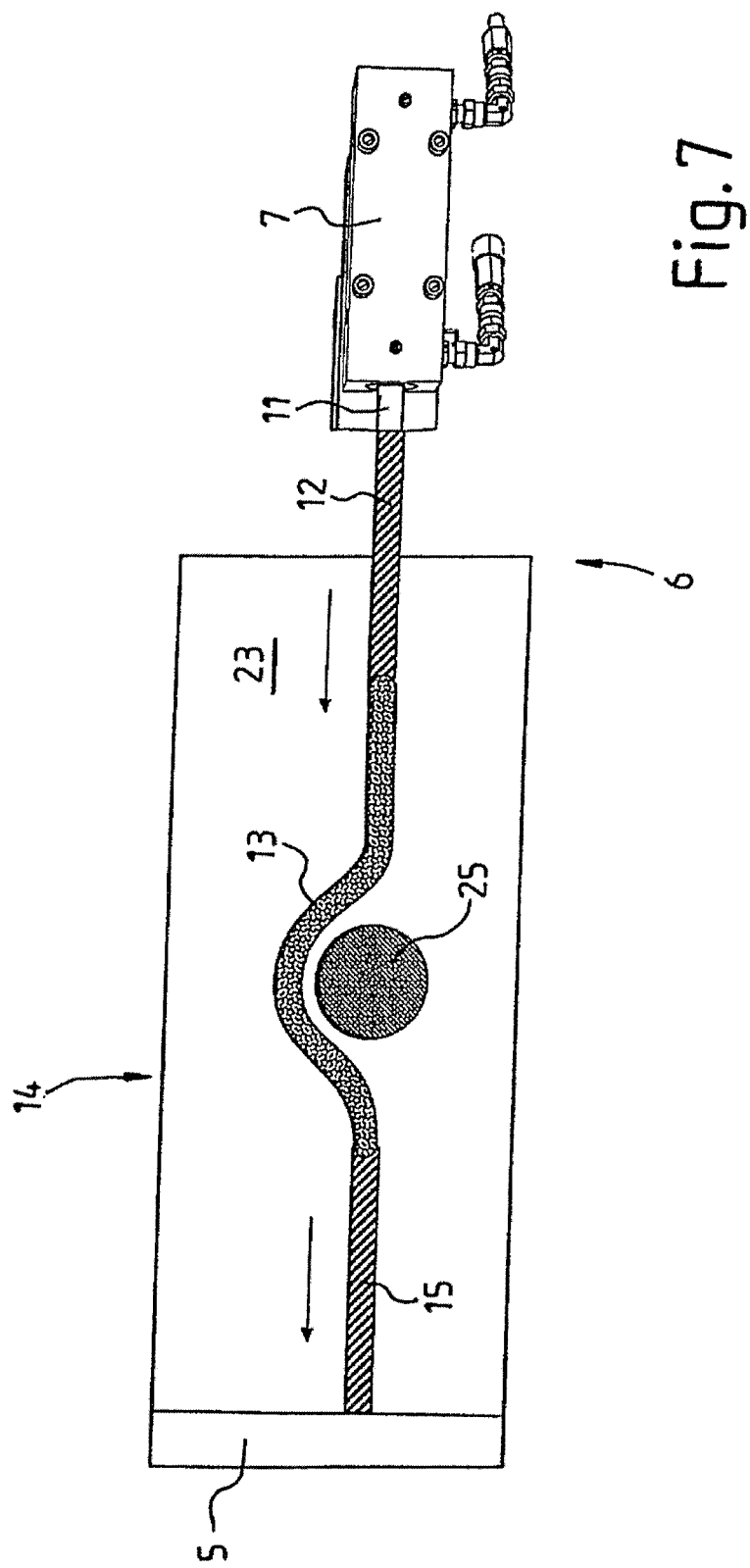
FIG. 7 shows a schematic view of a further drive unit according to the present invention with an obstacle to be bypassed.

FIG. 7 illustrates a further variant, wherein the chain 13 is guided around an obstacle 25, for example, a supply line, a shaft, a duct feedthrough or the like. For this purpose, only one correspondingly configured guide 14 or slot 22 of the guide element 23 needs to be provided. The other essential components can again be used unchanged.

FIG. 8 shows a further variant, wherein the chain 13 drives or adjusts a wheel 26 that is rotatable about an axle 27. In this way, the linear movement of the piston rod 11 can be converted into a rotation of the wheel 26, with the result that, for example, a rotary movement of a clamping jaw 5, of a mold element or the like can be generated. In this case, again essential components of the drive unit 6 can be carried over unchanged.

Figure 3:
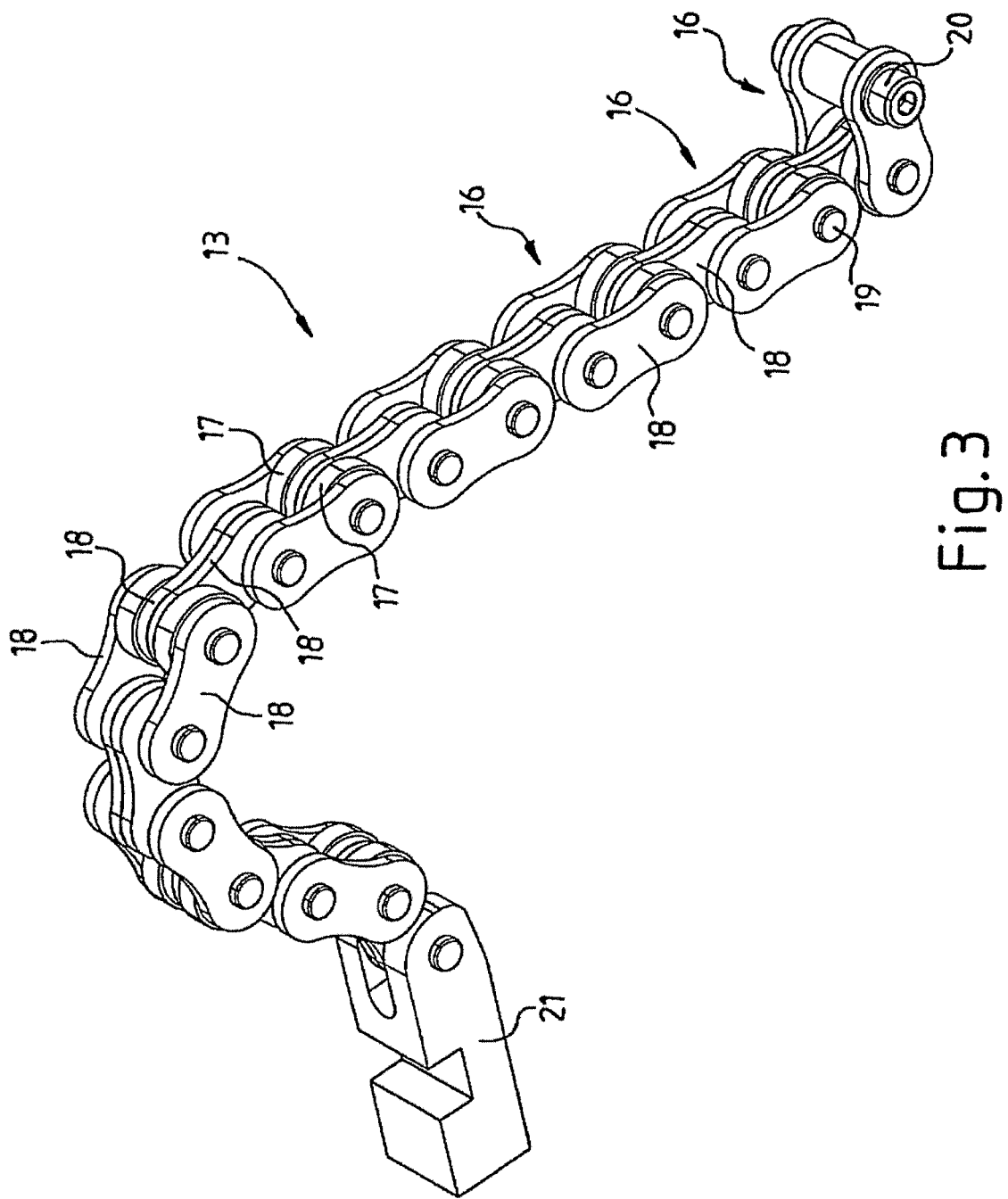
FIG. 3 schematically shows an exposed chain of the drive unit according to FIG. 2.
Figure 4:
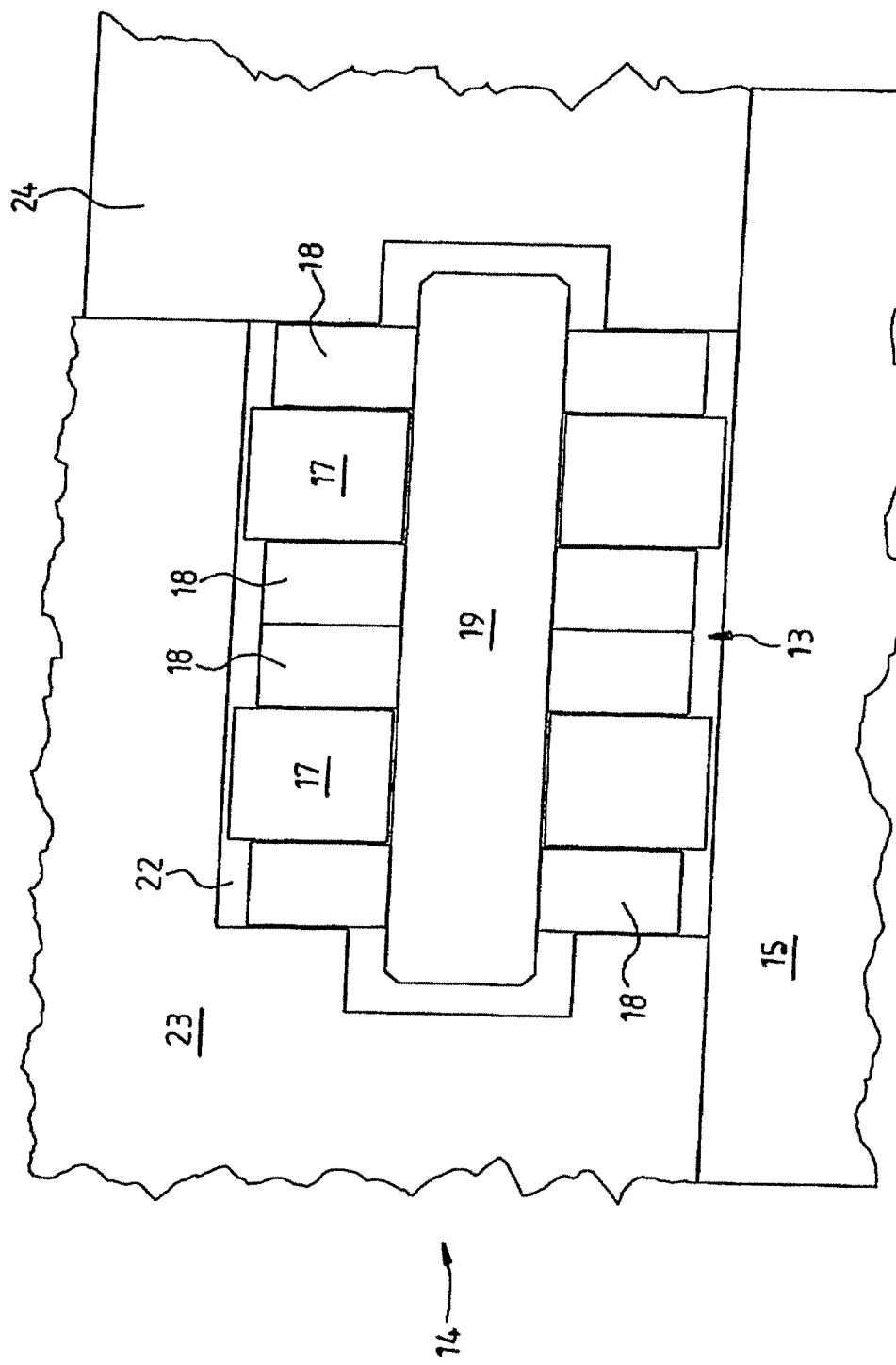
FIG. 4 shows a schematic section through the chain of the drive unit according to FIG. 2.
Figure 5:
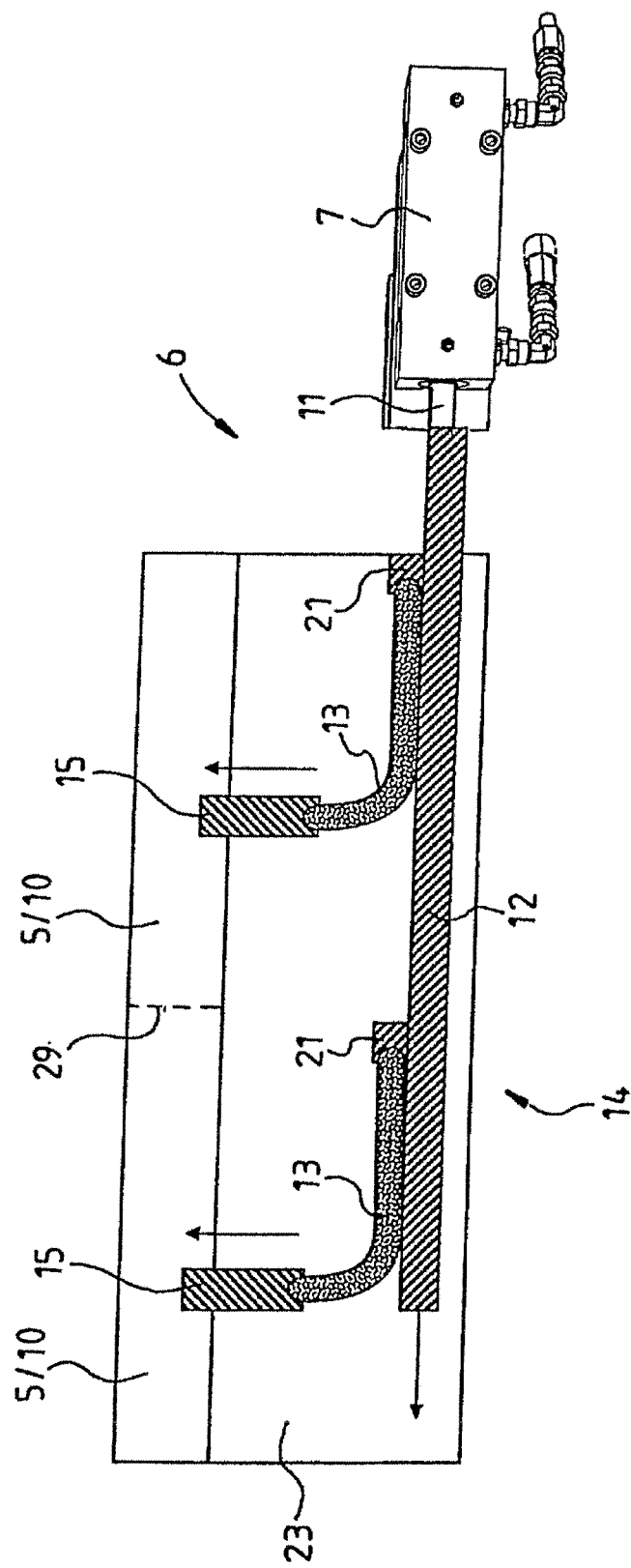
FIG. 5 shows a schematic variant of a drive unit according to the present invention with a common, first drive rod with two separate chains according to the present invention.

In FIGS. 3 and 4, the chain 13 is illustrated in more detail. The chain 13 or the chain links 16 advantageously comprise(s) link plates 18, which are connected together by means of pins 19. Provided between the link plates are rollers 17, which circumferentially have running surfaces, which in turn run/roll on guide faces of the slot 22 or of the guide 14.

Preferably, the diameters of the rollers 17 are greater than the heights of the link plates, and so only the rollers 17 are guided by the guide 14 or slot 22. The rollers 17 and/or the guide 14 or slot 22 can have (surface) hardening, such that the lifetime is increased and/or lubrication can be minimized.

In addition, two rollers 17 are provided/arranged advantageously along the pins 19, thereby effectively preventing tipping/tilting. This is of great advantage both with regard to abrasion and wear and with regard to smooth running of the chain 13 in the guide 14, in particular, in the curve 28.

It is also clear from the sectional illustration according to FIG. 4 that the slot 22 or the guide element 23 is formed into a closed, complete guide 14 or is closed by means of a cover element 24 and/or the pusher 15. It is also clear here that the slot 22 or the guide 14 has a degree of play, in particular, laterally along the pin 19, in order to reduce friction, inter alia.

In order to attach or connect the chain 13 to the drive rod 12 at one end and to the pusher 15 at the other end, a screw 20 and an end piece 21 are advantageously provided, but this can also take place, for example, by way of a pin.

LIST OF REFERENCE SIGNS

1 Receiving device
2 Profile
3 Profile
4 Joint
5 Clamping jaw
6 Drive unit
7 Reciprocating piston cylinder
8 Clamping jaw
9 Support
10 Ejector
11 Piston rod
12 Drive rod
13 Chain
14 Guide
15 Pusher
16 Chain link
17 Roller
18 Link plate
19 Pin
20 Screw
21 End piece
22 Slot
23 Guide element
24 Cover element
25 Obstacle
26 Wheel
27 Axle
28 Curve
29 Dashed line
30 Lifter

The invention claimed is:

1. A sealing profile receiving device comprising at least one first holding unit for receiving and holding a first sealing profile element, a second holding unit for receiving and holding a second sealing profile element, and at least one casting unit for casting at least one connecting portion for connecting the first sealing profile element to the second sealing profile element and/or for casting a first end termination of the first sealing profile element and a second end termination of the second sealing profile element, wherein the first holding unit comprises at least one first holding element and one second holding element that is adjustable relative to the first holding element, and the second holding unit comprises at least one third holding element and one fourth holding element that is adjustable relative to the third holding element, said device further comprising (i) at least one at least partially adjustable ejector unit for ejecting at least the first and/or second sealing profile element, (ii) at least one first drive unit for adjusting the second holding element, (iii) a second drive unit for adjusting the fourth holding element, (iv) a third drive unit for at least partially adjusting the ejector unit, and (v) a heating unit and/or cooling unit for at least partially heating and/or cooling the receiving device, wherein the first and/or second and/or third drive unit has at least one chain comprising a plurality of chain links, wherein each chain link comprises at least one roller, which has a running surface that is provided in a running direction of the chain and/or chain links, and at least one link plate, wherein the at least one roller is separated from the at least one link plate, and wherein the at least one roller and the at least one link plate are pivotably connected together by a pin that extends in a direction transverse to the running direction of the chain and/or chain links, with the running surface of the at least one roller having a diameter that is greater than a height of the at least one link plate, and the running surface of the at least one roller is arranged at least between two guide faces of a guide unit for guiding the chain and/or chain links, such that an adjusting force is able to be exerted both in the pulling direction and in the pushing direction of the chain by way of the first and/or second and/or third drive unit.

2. The device according to claim 1, wherein the first and/or second and/or third drive unit comprises at least one linear drive for linearly adjusting a first drive element.

3. The device according to claim 2, wherein the linear drive is in the form of a reciprocating piston-cylinder unit.

4. The device according to claim 2, wherein at least two chains are fixed to the first drive element of the linear drive, such that, when the first drive element is adjusted, the at least two chains are adjusted at the same time.

5. The device according to claim 2, wherein the first drive element is adjustable in a first adjusting direction and the second drive element is adjustable in a second adjusting direction, wherein the first adjusting direction is oriented at an angle to the second adjusting direction.

6. The device according to claim 5, wherein the first adjusting direction is oriented perpendicularly to the second adjusting direction.

7. The device according to claim 1, wherein the chain and/or chain links is/are arranged between the first drive element and a second drive element.

8. The device according to claim 1, wherein the guide unit comprises at least one guide slot and/or guide recess.

9. The device according to claim 1, wherein the guide unit comprises at least one curved and/or round guide portion for deflecting the chain and/or chain links.

10. The device according to claim 1, wherein the guide unit comprises at least one deflection wheel, which is rotatable about an axis of rotation, for deflecting the chain and/or chain links.

11. The device according to claim 1, further comprising a plastic injection molding machine for injecting at least one plastic into the casting unit.

* * * * *